Nov. 3, 1936.                H. A. KNOX                2,059,247
                    TRACK FOR TRACK LAYING VEHICLES
                        Filed June 13, 1935
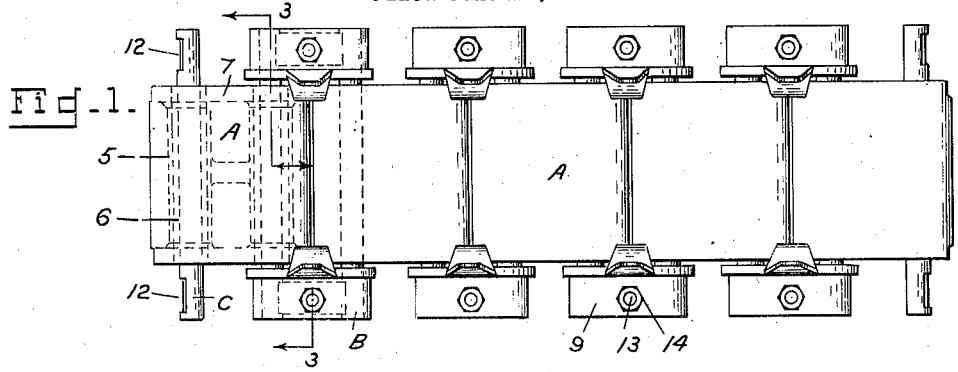
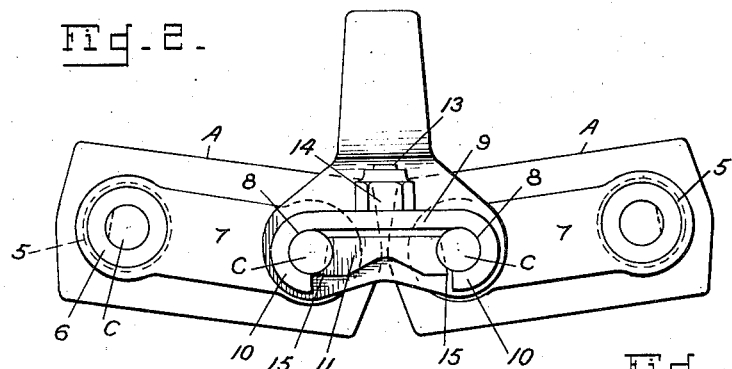
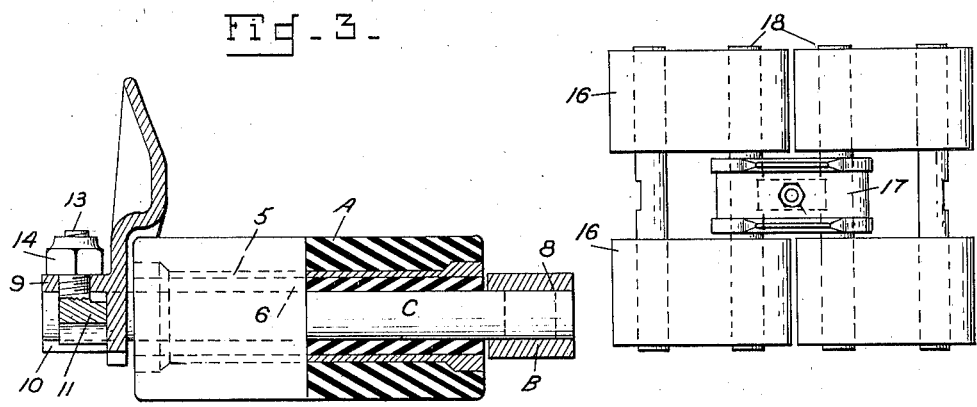
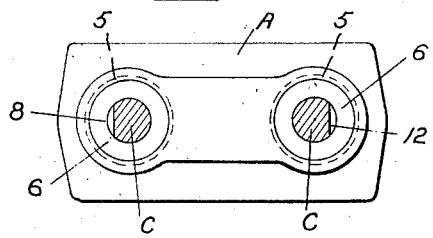
Inventor
Harry A. Knox
By N. N. Roach
Attorney

Patented Nov. 3, 1936

2,059,247

UNITED STATES PATENT OFFICE 2,059,247

TRACK FOR TRACK-LAYING VEHICLES

Harry A. Knox, Washington, D. C.

Application June 13, 1935, Serial No. 26,385

4 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles and is an improvement on the track shown in Patent No. 1,966,450 of July 17, 1934.

The track of the patent is composed of a series of rubber blocks whose inner sides constitute a rail for the supporting wheels of the vehicle and whose outer sides are adapted to engage the ground. Link pins extending laterally through the blocks are rigidly connected by links. In this track the shoe must be replaced when the outer tread wears down even though the inner rail and the elements of the connection are in good condition.

The purpose of this invention is to constitute the track shoe so that it may be readily inverted or reversed when one side becomes worn without requiring alternation of the connections.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of an endless track constructed in accordance with the invention.

Fig. 2 is a view in side elevation.

Fig. 3 is a sectional view on the line 3—3 of Fig. 1.

Fig. 4 is a view in side elevation of a shoe, the link pins in section.

Fig. 5 is a plan view showing the invention in a double track.

Referring to Figs. 1 to 4, the track comprises a series of shoes A connected in spaced relation by links B mounted on link pins C.

The shoes are all identical and symmetrical and each consists of a block of rubber or similar material. The link pins C—C passing transversely through opposite ends of the blocks, are arranged for a limited rotational displacement relative to the shoe in any manner known to the art. One arrangement of this character is shown in the patent previously referred to and another arrangement is illustrated in the drawing in which a metal bearing 5 fixed in the block A contains a rubber bushing 6 whose outer surface is fixed to the bearing and whose inner surface is fixed to the link pin C. In this example the two bearings 5—5 in each block are rigidly connected by webs 7.

The link pins C project sufficiently to accommodate the links B, each of which has a pair of apertures 8—8 whereby the ends of adjoining link pins of adjacent shoes may be received. As covered by the patent, the outer side of each link has a laterally projecting flange 9 with turned ends 10 adapted to hook over the link pins. A bolt insertable between the link pins has a wedge-shaped head 11 receivable in grooves or slots 12 in the link pins. The shank 13 of the bolt passes through the flange 9 and a nut 14 is applied to the bolt and bears against the flange. This connection holds the link in place and locks the associated link pins against independent rotational movement.

The grooves or slots 12 are formed perpendicularly to the plane containing the longitudinal axis of each link pin of a shoe so that it is immaterial if either one of adjacent shoes is reversed or turned about. The inclination of the opposite faces 15—15 of the wedge-shaped head 11 determines the angular relation of assembly of adjoining shoes as shown in Fig. 2. The angle of assembly is about 7 to 8 degrees which is one-half the total angle of flection in passing around the wheels of the vehicle.

The links B and the webs 7 of the bearings are spaced from the tread and rail surfaces of the shoe, which are the wearing surfaces so that considerable wear may occur before the plane of these surfaces reaches the metal. The shoes are assembled without distinction as to road and rail surface and when the tread surface becomes worn the shoe is disconnected, reversed and then reconnected.

The positions of the links are not limited to the ends of the link pins. As indicated in Fig. 5 where parallel series of shoes 16 are employed, the links 17, connecting the link pins 18, are centrally located.

I claim:

1. In a track for track-laying vehicles, a series of spaced shoes, each shoe including a rubber block having opposite wearing surfaces, a pair of link pins extending laterally through and fixed in opposite ends of each block, said pins projecting beyond at least one side of the block and each having a groove in the projecting portion, said grooves disposed perpendicularly to the plane containing both link pins of a shoe, a link connecting adjoining pins of adjacent shoes and means carried by each link and engaging the grooves of the corresponding link pins for holding the link pins against independent rotational movement.

2. In a track for track-laying vehicles, a series of spaced shoes, each shoe including a block having opposite wearing surfaces, a pair of link pins extending laterally through and fixed in opposite ends of each block, said pins projecting beyond at least one side of the block and each having a groove in the projecting portion, said grooves disposed perpendicularly to the plane containing both link pins of a shoe, a link connecting adjoining pins of adjacent shoes, and means carried by each link and engaging the grooves of the corresponding link pins for holding the link pins against independent rotational movement.

3. In a track for track-laying vehicles, a series of spaced shoes each having opposite wearing surfaces and being reversible, a pair of link pins extending laterally through and fixed in opposite ends of each shoe, each pin having a locking surface disposed perpendicularly to the plane containing both link pins of a shoe, a link connecting adjoining pins of adjacent shoes, and means carried by each link and engaging the locking surfaces of corresponding link pins for holding the link pins against independent rotational movement.

4. In a track for track-laying vehicles, a series of spaced shoes, each having opposite wearing surfaces and being reversible, a pair of link pins extending through and fixed in opposite ends of each shoe, links connecting adjoining link pins of adjacent shoes, and means carried by each link and engaging the link pins in either position of assembly of the shoes for holding the shoes in the same angular assembly relation and maintaining the link pins against independent rotational movement.

HARRY A. KNOX.